United States Patent
Wilhoit

[15] 3,654,648
[45] Apr. 11, 1972

[54] WINDSHIELD

[72] Inventor: Jerry W. Wilhoit, Austin, Tex.

[73] Assignee: Glastron Boat Company, Austin, Tex.

[22] Filed: Aug. 5, 1970

[21] Appl. No.: 61,149

[52] U.S. Cl. .................................................9/1 R
[51] Int. Cl. ......................................B63b 17/00
[58] Field of Search ......................9/1 R, 400; 114/0.5 R;
244/121, 129 W, 129 R, 117 R; 296/84 R, 84 C, 92,
93; 52/717, 718, 506, 403

[56] References Cited

UNITED STATES PATENTS 2,102,123  12/1937  Leveau..................................9/1 R
2,716,529  8/1955  Czerwinski....................244/129 W X
3,304,657  2/1967  Singleton................................9/1 R X Primary Examiner—Milton Buchler
Assistant Examiner—F. K. Yee
Attorney—Hyer, Eickenroht, Thompson & Turner

[57] ABSTRACT

A windshield for the hood of a motorboat or the like comprising first and second windshield sections having side edges longitudinally slidably interlocked with one another in a desired angular relation and anchored to the hood by connectors longitudinally slidably interlocked with the lower edges of the sections and the upper sides of base members mounted on the hood, respectively.

13 Claims, 7 Drawing Figures

PATENTED APR 11 1972 3,654,648
SHEET 1 OF 2
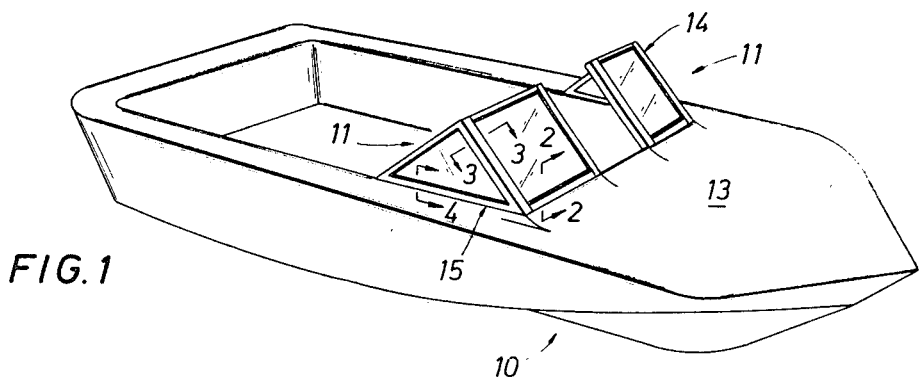
FIG.1
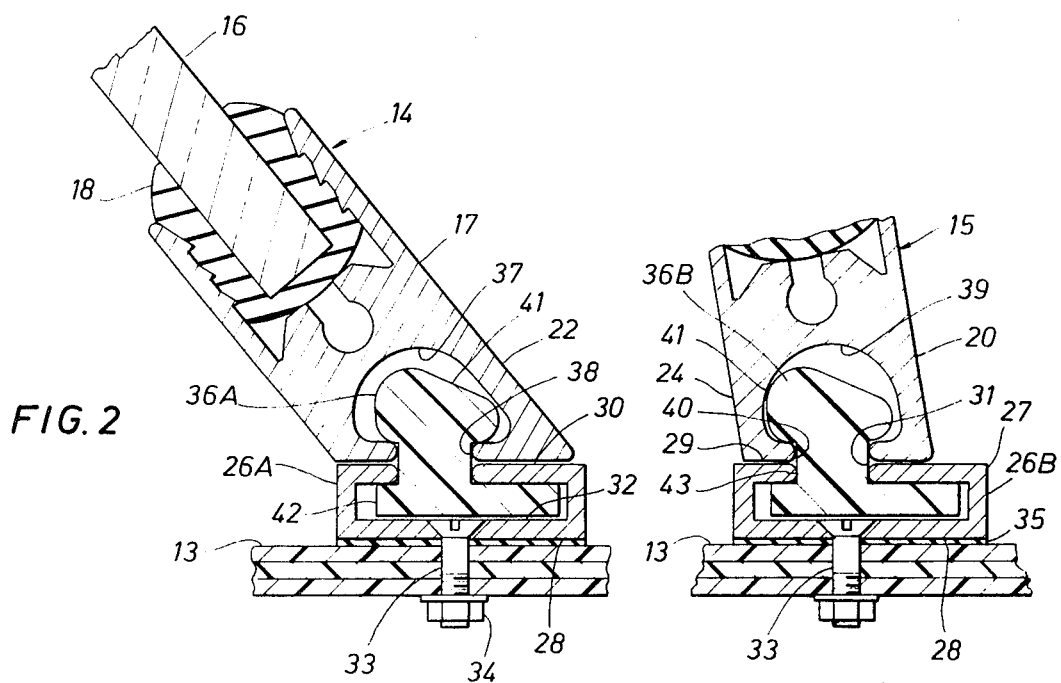
FIG.2
FIG.4
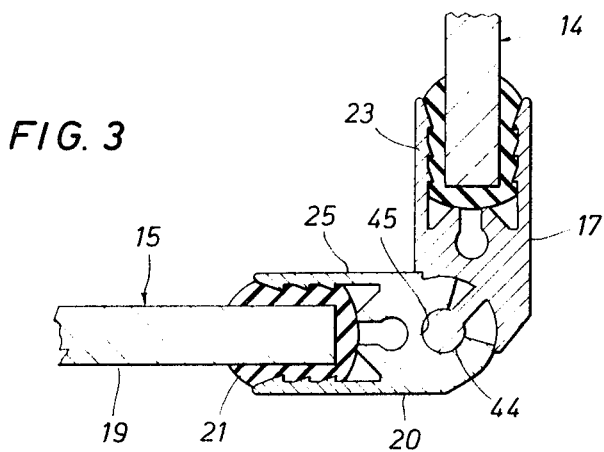
FIG.3
Jerry W. Wilhoit
INVENTOR
BY Hyer, Eickenroht,
Thompson & Turner
ATTORNEYS Jerry W. Wilhoit
INVENTOR

WINDSHIELD

This invention relates in general to windshields; and, more particularly, to improvements in sectional windshields for the hood of a motorboat or the like.

In prior windshields of this type, each section has a longitudinal groove along its lower edge which receives an enlarged head on one or more threaded bolts which extend through holes in the hood. Nuts on the lower ends of the bolts enable the enlarged heads to hold flanges forming slots into the groove tightly against the top side of the hood. The side edges of the windshield sections are connected to one another by means of a tongue on one and a groove on the other, and the relative angular relation of the sections is determined by the arrangement of the bolt holes on the hood.

Windshields of this construction are decorative in that the fasteners are concealed from view at the top of the hood. However, they are extremely awkward to mount due to the necessity of manipulating the fasteners from beneath the hood while holding the sections in proper position above the hood. This problem is especially acute when, as is the usual practice, the motorboats are shipped to the customers with the windshield dismounted.

An object of this invention is to overcome these and other problems in connection with the prior windshield.

A more specific object is to provide a windshield in which the sections may be mounted on the hood without the necessity of manipulating fasteners from beneath the hood or while holding the sections.

Another object is to provide such a windshield which requires only a small number of parts, and, more particularly, in which several of the connecting parts may be made from identical extrusions.

These and other objects are accomplished, in accordance with the illustrated embodiment of the invention, by a windshield which includes a pair of base members adapted to be mounted on the hood at a desired angle with respect to one another, and a pair of windshield sections each having a lower edge adapted for connection to one of the base members and a side edge for connection to the side edge of the of the windshield section.

A means is provided for first connecting the lower edge of a first section to a first base member, and the side edges of the sections are provided with parts which enable the second section to be longitudinally slidably interconnected with the first section. The lower edge of the second section may then be connected to the second base member by a connector which has means thereon for longitudinally slidably interlocking with means on such lower edge and such base member, respectively. With such a windshield, any manipulation of fasteners required for mounting the base members on the hood may be done in the factory, and the windshield sections may be shipped for assembly by the customer from the top of the hood.

In the preferred embodiment of the invention, the means for connecting the lower edge of the first windshield section to the first base member includes means on said lower edge for longitudinally slidably interlocking with means on the first base member. Thus, at least one of the longitudinally slidably interlocking means may comprise a part identical in transverse cross section to one of the longitudinally slidably interlocking means on the connector. More particularly, the longitudinally slidably interlocking means comprises another connector similar to the connector for connecting the lower edge of the second section to the second base member. In this way, both the connectors and the base members may be identical in transverse cross section, thereby further reducing the number of different extrusions necessary for the windshield.

In the drawings, wherein like reference characters are used throughout to designate like parts:

FIG. 1 is a perspective view of a motorboat having windshields mounted on each side of the hood thereof in accordance with the present invention;

FIG. 2 is a vertical sectional view of the connection of the lower edge of the front section of each windshield to a base member extending laterally of the hood;

FIG. 3 is a cross-sectional view of the connection of the side edges of the front and side sections of each windshield;

FIG. 4 is a vertical cross-sectional view of the connection of the lower edge of the side section of each windshield to a base member extending longitudinally of the hood;

Figure 5:
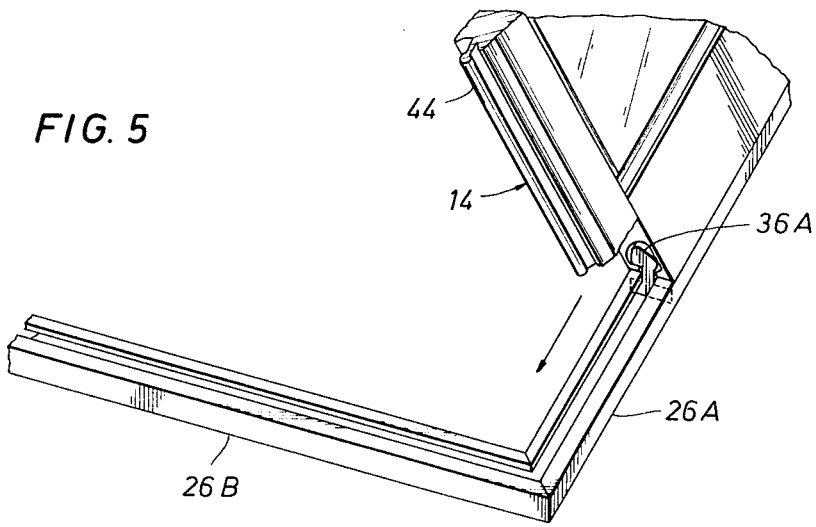
FIG. 5 is a perspective view of the front section of one of the windshields during its connection to one of the base members.

With reference now to the details of the above-described drawings, and as shown in FIG. 1, a pair of windshields 11 are mounted on the hood 13 of the motorboat 10 forwardly of its passenger compartment. Each windshield 11 includes a front section 14 and a side section 15, with the front sections extending laterally of the hood and spaced from one another to provide access between the hood and passenger compartment. The side sections 15 extend longitudinally of the hood rearwardly from connection to the outer sides of each of the front sections.

As shown, each front section extends upwardly and rearwardly with respect to the hood, each side section extends upwardly at substantially a right angle to the hood, and the front and side sections are connected to one another at substantially a right angle. Although this arrangement of the windshield sections is typical for this type of vehicle, it will be obvious from the description to follow that the invention is applicable to other arrangements of the windshield sections with respect to one another and to the hood or other structure on which they are mounted.

The front section 14 of each windshield 11 comprises a pane 16 of glass surrounded by a frame 17 carrying a rubber gasket 18 for sealing about the outer edges of the glass pane 16. Each side section 15 of the windshield similarly includes a pane of glass 19 surrounded by a frame 20 which carries a gasket 21 for sealing about the outer edges of the glass pane 19. Each of the frames 17 and 20 is made up of extrusions about all four sides, including extrusions 22 and 23 on the bottom and outer side of frame 17, and extrusions 24 and 25 on the bottom and outer side of frame 20. Each extrusions has an identical recess along its inner edge for receiving the gaskets 18 and 21.

As previously described, the lower edges of the windshield sections 14 and 15 are connected to the hood 13 by means of base sections 26A and 26B, respectively, which, as shown in FIGS. 2 and 4, are identical in transverse cross section. Thus, each comprises a lower side 28 adapted to be connected to the hood 13 and spaced apart flanges 29 and 30 on its upper side defining a longitudinal slot 31 into a groove 32 extending along the base member.

Each base member is connected to the hood and at the desired angle with respect to the other by means of a plurality of bolts 33 extending through aligned holes in the lower side 28 of the base member and the hood 13. Thus, nuts 34 may be secured over the lower threaded ends of the bolts 33 so as to hold the lower side of the base member tightly against the hood. Preferably, a flat gasket 35 is compressed between the base member and the hood.

As best shown in FIGS. 2 and 4, the lower edges of lower extrusions 22 of the windshield section 14 and lower extrusion 24 of the windshield section 15 are connected to base members 26A and 26B, respectively, by means of connectors 36A and 36B. As in the case of the base members, each of the connectors 36A and 36B comprises an extrusion which is identical in cross section.

More particularly, the lower edge of lower extrusion 22 is provided with a groove 37 and a pair of flanges defining a longitudinal slot 38 into the groove, and the lower edge of the lower extrusion 34 is provided with a groove 39 and a pair of flanges defining a longitudinal slot 40 into the groove. As shown in FIGS. 2 and 4, the longitudinal slot into each of the grooves 37 and 39 is adapted to be longitudinally aligned with the slot into the base member 26A or 26B, respectively.

Each connector 36A and 36B has a tongue 41 on its upper side which is longitudinally slidable into interlocking relation with the groove 37 in the case of the windshield section 14 and into interlocking relation with the groove 39 in the case of the windshield section 15. Each such connector also has a tongue 42 on its lower side which is longitudinally slidable into interlocking relation with the groove 32 in each base member. More particularly, the tongues 41 and 42 are connected by a web 43 which extends through the aligned slots in the lower edges of the windshield sections and upper sides of the base members.

As best shown in FIGS. 2 and 4, the web 43 is of just slightly smaller width than the aligned slots so as to prevent substantial lateral movement of the windshield sections with respect to the base members. Also, the tongues 41 and 42 are spaced from one another along the web 43 a distance just slightly larger than the combined thicknesses of the flanges on the lower edges of the windshield sections and upper sides of the base members, so that such flanges are held tightly together between the tongues, thereby preventing any substantial vertical movement between the windshield sections and the base members.

The side edges of the side extrusions 23 and 25 of the windshield sections 14 and 15, respectively, are also longitudinally slidably interlocked. Thus, as shown in FIG. 3, a tongue 44 on the side edge of side extrusion 23 fits closely within a groove 45 in the right edge of side extrusion 25. More particularly, each of the tongue and groove are circular in cross section, and the side edges of the extrusion 25 on each side of the groove 45 are relieved to permit the extrusions 23 and 25, and thus the windshield sections, to be arranged at different angular relations with respect to one another.

As previously described, the frame sections 26A and 26B are mounted on the hood 13 at the factory, and at an angle with respect to one another which determines the angular relationship of the front and side windshield sections with respect to one another. Preferably, the ends of the frame sections are mitered, so as to permit them to intersect, as shown in FIG. 5. The windshield sections and the connectors 36A and 36B are shipped with the boat 10 for assembly by the dealer or customer.

Figure 6:
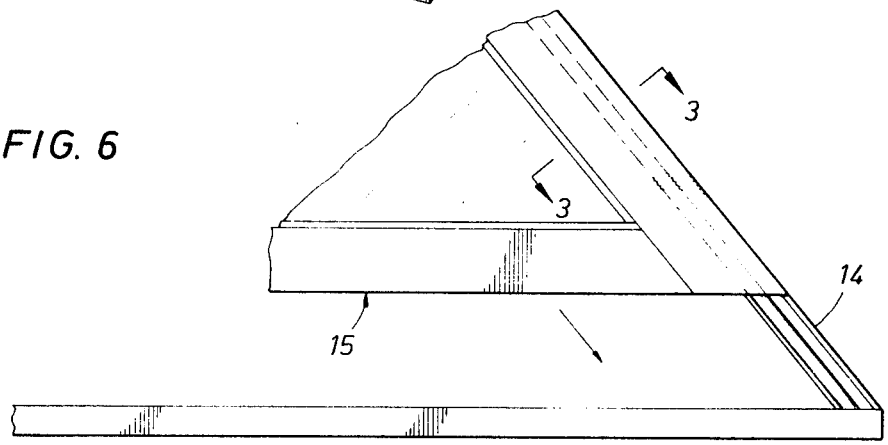
FIG. 6 is a side elevational view of the side section of the windshield during its connection to the front section.
Figure 7:
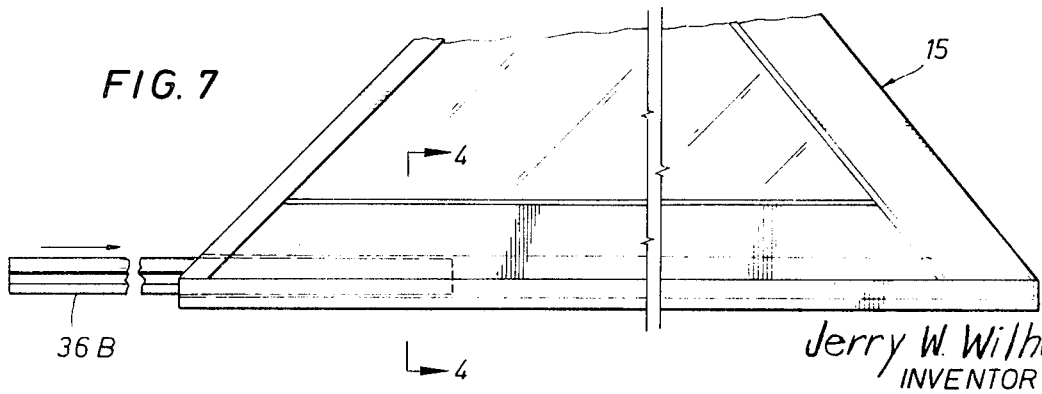
FIG. 7 is a side elevational view during connection of a side section to the other base member.

In the assembly procedure illustrated in FIGS. 5 to 7, the front windshield section 14 is first connected to the base member 26A by means of the connector 36A. This may be done in a number of ways, as by aligning the slots in the lower edge of the windshield section and base member 26A and then moving the connector 36A into longitudinally slidably interlocking relation with the grooves in the lower edge of the windshield section and the base member. Alternatively, the connector 36A may be preassembled with the windshield section 14, as shown in FIG. 5, or the base member 26A. In any event, the windshield section is moved into fully interlocked position with the base member 26A so as to dispose the tongue 44 on its inner edge generally above the intersection of the base members 26A and 26B.

At this time, the windshield section 15 is moved into interlocked position with the windshield section 14. For this purpose, the groove 45 on the side edge of the section 15 is caused to slide longitudinally downwardly over the tongue 44 until the lower edge of the section 15 abuts with the upper side of the frame 26B.

The lower edge of the frame section 15 is then swung to a position to align the slot leading into the groove 39 with the slot on the upper side of frame member 26B. The connector 36B is then caused to slide longitudinally through the aligned slots and grooves for longitudinally interlocking the lower edge of the section 15 to the base member 26B.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A windshield for the hood of a motorboat or the like, comprising first and second base members adapted to be mounted on the hood at an angle with respect to one another, first and second windshield sections each having a lower edge and a side edge, means for connecting the lower edge of the first windshield section to the upper side of the first base member to connect said first section to the first member, means on the side edges of the second windshield section for longitudinally slidably interlocking with means on the side edge of the first windshield section to connect the second section to the first section, and a connector having means thereon for longitudinally slidably interlocking with means on the lower edge of the second windshield section and the second base member, respectively, to connect said second section to said second member.

2. A windshield of the character defined in claim 1, wherein said connecting means includes means on one of said lower edge and upper side for longitudinally slidably interlocking with means on the other of said lower edge and upper side.

3. A windshield of the character defined in claim 2, wherein the slidably interlocking means comprises another connector having means thereon for longitudinally slidably interlocking with means on the lower edge of the first section and the upper side of the first member, respectively.

4. A windshield of the character defined in claim 3, wherein said first and second base members are identical in transverse cross section.

5. A windshield of the character defined in claim 3, wherein said connectors are identical in transverse cross section.

6. A windshield of the character defined in claim 4, wherein said connectors are identical in transverse cross section.

7. A windshield of the character defined in claim 1, wherein the means on the side edges of the first and second sections comprises a tongue on one swingable within a groove on the other to permit connection of the sections in different angular relations.

8. A windshield for the hood of a motorboat or the like, comprising a pair of base members each having a lower side for connection to the hood at an angle with respect to the other and a longitudinal groove along its upper side, a pair of windshield sections each having a longitudinal groove along its lower edge, a groove on the side edge of one and a tongue on the side edge of the other section longitudinally slidably interlocking with one another, and a pair of connectors each having a tongue along its upper side for longitudinally slidably interconnecting with the groove along the lower edge of one of said sections and a tongue along its lower side for longitudinally slidably interconnecting with the grove along the upper side of one of said base members.

9. A windshield of the character defined in claim 8, wherein said base members are identical in transverse cross section.

10. A windshield of the character defined in claim 8, wherein said connectors are identical in transverse cross section.

11. A windshield of the character defined in claim 9, wherein said connectors are identical in transverse cross section.

12. A windshield of the character defined in claim 8, wherein the tongue and groove on the side edges of the windshield sections are relatively swingable about a longitudinal axis to permit connection of said sections in different angular relations.

13. A windshield of the character defined in claim 8, wherein the lower edges of the windshield sections and upper sides of the base member each having laterally spaced apart flanges defining a slot into the groove therealong, and each connector has a web connecting the tongues on its upper and lower sides, said web fitting closely within the slots to limit laterally shifting of the lower edges of the sections relative to the base members, and said flanges fitting closely between the tongues so as to tightly engage with one another.

* * * * *